US007950205B2

(12) United States Patent
Gates

(10) Patent No.: US 7,950,205 B2
(45) Date of Patent: May 31, 2011

(54) METHOD FOR REMOVING A POUCH FROM A POUCH CONTAINER

(76) Inventor: Anthony H. Gates, Alliance, OH (US)

( * ) Notice: Subject to any disclaimer, the term of this patent is extended or adjusted under 35 U.S.C. 154(b) by 86 days.

(21) Appl. No.: 12/274,761

(22) Filed: Nov. 20, 2008

(65) Prior Publication Data

US 2009/0127258 A1 May 21, 2009

Related U.S. Application Data

(60) Provisional application No. 60/989,437, filed on Nov. 20, 2007.

(51) Int. Cl.
*B65B 43/18* (2006.01)
(52) U.S. Cl. ............... 53/459; 53/571; 206/554; 221/45
(58) Field of Classification Search .................. 53/459, 53/468, 469, 492, 570, 571, 573, 284.7, 384.1–386.1, 53/572; 206/554; 221/45; *B65B 43/18*
See application file for complete search history.

(56) References Cited

U.S. PATENT DOCUMENTS

| | | | | |
|---|---|---|---|---|
| 1,733,345 A | * | 10/1929 | Hartman | 53/571 |
| 3,691,715 A | * | 9/1972 | Kelly et al. | 53/459 |
| 3,699,741 A | * | 10/1972 | Norman | 53/459 |
| 3,868,807 A | * | 3/1975 | Noyes et al. | 53/459 |
| 4,019,546 A | * | 4/1977 | Hastrup | 53/459 |
| 4,037,387 A | * | 7/1977 | Orikawa | 53/459 |
| 4,078,358 A | * | 3/1978 | Henderson | 53/459 |
| 4,487,318 A | * | 12/1984 | Roen | 206/554 |
| 4,537,330 A | * | 8/1985 | Gelbard | 221/45 |
| 4,712,684 A | * | 12/1987 | Boeckmann | 206/554 |
| 4,805,800 A | * | 2/1989 | Nocek et al. | 206/554 |
| 4,884,389 A | * | 12/1989 | McGregor | 53/571 |
| 5,061,146 A | * | 10/1991 | Nelson | 53/386.1 |
| 5,070,674 A | | 12/1991 | Lerner | |
| 5,077,958 A | | 1/1992 | Peppard | |
| 5,259,172 A | | 11/1993 | Peppard | |
| 5,265,402 A | | 11/1993 | Lerner | |
| 5,337,541 A | * | 8/1994 | Gmuer | 53/459 |
| 5,346,200 A | | 9/1994 | Sarvik | |
| 5,368,165 A | * | 11/1994 | Ngyuen | 206/554 |
| 5,394,674 A | | 3/1995 | Peppard | |
| 5,509,570 A | * | 4/1996 | DeMatteis | 221/64 |
| 5,619,839 A | | 4/1997 | Peppard | |
| 5,626,004 A | | 5/1997 | Gates | |

(Continued)

FOREIGN PATENT DOCUMENTS

JP   01226522 A   *   9/1989

(Continued)

*Primary Examiner* — Stephen F Gerrity
(74) *Attorney, Agent, or Firm* — Zollinger & Burleson Ltd.

(57) ABSTRACT

Pouches are provided to the user of an automated pouch handling apparatus in a pouch container. The pouches are oriented the same way in the box. The box may be sealed to prevent pouch contamination. A door on the box is opened or removed to define a door opening. A portion of the pouch stack is accessible through the opening. These pouch containers may be stacked near a pouch handling apparatus where the operator may open the door and load the pouch containers directly into the pouch handling apparatus. The pouch handling apparatus removes the pouches directly from the pouch container through the door opening. The apparatus may include a pouch separator that bends the edge of the pouch out through the door and slides the first pouch away from the second pouch.

15 Claims, 7 Drawing Sheets

U.S. PATENT DOCUMENTS

| | | | |
|---|---|---|---|
| 5,655,352 A * | 8/1997 | Murakami | 53/384.1 |
| 5,655,682 A * | 8/1997 | Hoffrichter | 221/45 |
| 5,857,586 A * | 1/1999 | Scherr | 221/45 |
| 6,401,971 B1 * | 6/2002 | Edwards et al. | 221/26 |
| 6,508,381 B1 * | 1/2003 | Sadi | 221/45 |
| 6,550,226 B1 | 4/2003 | Gates | |
| 6,662,532 B1 | 12/2003 | Droog | |
| 6,742,321 B2 | 6/2004 | Gates | |
| 6,779,922 B2 | 8/2004 | Gates | |
| 6,955,032 B2 * | 10/2005 | Smith | 53/566 |
| 7,363,743 B2 | 4/2008 | Morken | |
| 7,363,753 B2 * | 4/2008 | Gates et al. | 53/459 |
| 2004/0103619 A1 | 6/2004 | Droog | |
| 2004/0168412 A1 | 9/2004 | Greening | |
| 2006/0162291 A1 | 7/2006 | Gates | |

FOREIGN PATENT DOCUMENTS

| | | | |
|---|---|---|---|
| JP | 04201817 A * | 7/1992 | |
| JP | 09020314 A * | 1/1997 | |

* cited by examiner

METHOD FOR REMOVING A POUCH FROM A POUCH CONTAINER

CROSS REFERENCE TO RELATED APPLICATIONS

This application claims the benefit of U.S. Provisional Patent Application Ser. No. 60/989,437 filed Nov. 20, 2007; the disclosures of which are incorporated herein by reference.

BACKGROUND OF THE INVENTION

1. Technical Field

The present invention generally relates to a pouch container and methods for handling pouches and, more particularly, to methods and apparatus for removing pouches from a pouch container.

2. Background Information

A wide variety of pouch handling apparatus are known in the art for performing different actions on empty, unsealed pouches. One class of these apparatus load empty, unsealed pouches into a filling a station, fill the pouches with product, and then seal the pouches. Loading empty, unsealed pouches into the pouch handling apparatus is a problem common to most apparatus. One solution is to require the pouches to be individually loaded by a worker. Although accurate, this method is expensive due to the cost of the worker and the lower throughput of the apparatus. Other apparatus receive empty pouches on pouch wickets. Wicketed pouches may be individually removed from the wicket by partially opening the front pouch and pulling the pouch from the wicket with grippers that pinch the sides or top of the pouch. Drawbacks with wicketed pouches include the cost of providing the pouches on the wicket and the waste generated when the flange having the wicket holes is discarded after the pouch is sealed. Pouch handling apparatus that avoid the waste of wicket flanges include those that receive empty, unsealed pouches in simple stacks held in a pouch magazine. Although these pouches are easy to provide and easy to load, those skilled in the art have been challenged by making reliable automated pouch removable mechanisms. Stacked pouches have a tendency to cling to one another (static electricity forces and/or intermolecular attractions) thus requiring mechanisms that overcome the problem of grabbing a single pouch instead of a plurality of pouches. Various prior art solutions exist for this problem. Another problem with using stacks of pouches is the hassle of loading the pouch stacks into the pouch magazine. The worker loading the pouches into the apparatus can load them the wrong way, skew the stacks, or drop portions of the pouches on the floor. Manual loading increases the chances of the pouches becoming contaminated. The art thus desires a more efficient manner of loading stacks of pouches into a pouch handling apparatus.

BRIEF SUMMARY OF THE INVENTION

In one configuration, the invention provides a method and apparatus for loading pouches into a pouch handling apparatus. The pouches are provided to the user in a container. The pouches are oriented the same way in the box. A door on the box is opened or removed to define a door opening. A portion of the pouch stack is accessible through the opening. These pouch containers may be stacked near a pouch handling apparatus where the operator may open the door and load the pouch containers directly into the pouch handling apparatus. The pouch handling apparatus removes the pouches directly from the pouch container through the door opening.

In another configuration, the pouches may be removed from the pouch container with a pouch separator that bends an edge of the pouch away from the next adjacent pouch and sliding the pouch away from the plurality of adjacent pouches. The pouch separator reaches in through the door opening of the pouch container to engage the bottom pouch. The separator then bends a portion of the pouch down through the door opening so that the pouch can be grabbed and pulled out of the box.

In a further configuration of the invention, a pouch container for use in a pouch handling apparatus holds a plurality of pouches with a portion of the pouches aligned with a door. The pouch container may be loaded directly into a pouch handling apparatus that removes the pouches directly from the pouch container. In one configuration, the pouch container is in the form of a box having a tear-off or pivoting door. In another configuration, the container has a reusable door so that the container may be refilled with pouches. The reusable door may slide, pivot, or snap back in place. Such a reusable container may be collapsible for reduced shipping volume when it is sent back the pouch manufacturer to be refilled.

The invention also provides a method for providing empty pouches to a pouch filling and sealing apparatus in sanitary manner. This method is particularly useful in the medical and food industries where contamination of materials must be avoided. In this configuration of the invention, the pouches may be sealed inside a sanitary pouch container after the pouches are manufactured. The sealed container is opened when the door of the pouch container is opened after the pouch container is inside the clean room wherein the pouches are to be filled and sealed. The user may open the door and then place the entire pouch container in the magazine of the filling and sealing apparatus. This minimizes the interaction with the pouches and thus prevents contamination. The seal of the pouch container may be broken by the act of opening the door of the container. The seal also may be opened after the door has been opened. The pouch container may be sealed with a liner. A portion of the liner may be connected to the door so that the liner is torn open when the door is open to expose the pouches.

These invention embodiments may be used individually or in combination to provide methods and apparatus.

DISCLOSURE OF THE INVENTION

Similar numerals refer to similar parts throughout the drawings.

DETAILED DESCRIPTION OF THE PREFERRED EMBODIMENT

Figure 1A:
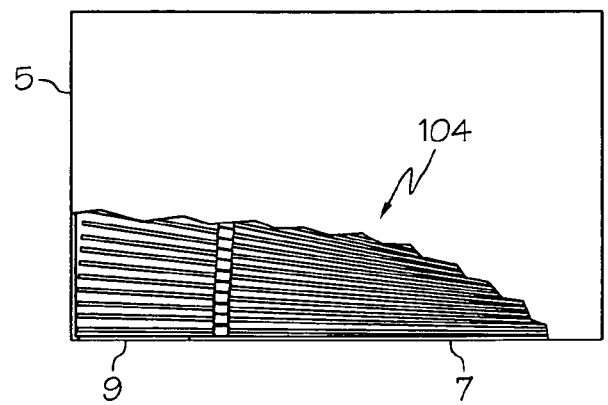
FIG. 1A is a side view showing a pouch packaging apparatus with its door closed; a portion of the sidewall of the apparatus being broken away to show a plurality of stacked pouches within the apparatus.

An exemplary pouch holding magazine is indicated by the numeral 2 in the accompanying drawings. Magazine 2 is configured to receive a pouch container 5 that holds a plurality of stacked pouches 104 in a configuration where they may be removed directly from container 5 one at a time by a pouch handling apparatus 100. Magazine 2 thus defines a gap or space that does not interfere with the door opening of container 5. Apparatus 100 may perform any of a variety of tasks on the pouch after it is removed. These tasks include opening, filling, and sealing the pouch.

In the exemplary configuration, pouch container 5 is in the form of a box sized just larger than a single stack of pouches 104 so that pouches 104 do not become significantly unstacked or disordered when container 5 is transported regardless of its orientation. In one configuration, container 5 is substantially filled with pouches 104 so that pouches 104 do not become disordered. In another configuration, container 5 includes a member 6 (such as an inwardly projecting arm or flap) that engages the stack 104 of pouches to hold stack 104 in the desired stacked arrangement. A further configuration includes a container body fabricated from a flexible material, such as a plastic, that functions to container stack 104 init desired, ordered configuration.

Container 5 may be fabricated from a variety of packaging materials such as paper-based materials, plastic materials, and other materials known to the packaging industry. Corrugated cardboard is one material that may be used for a box-shaped container 5. In another configuration of the invention, container 5 is fabricated from a polymer or other material that has been manufactured or cleaned in a manner that is suitable for use in the food packaging or medical packaging industries. Container 5 may be sealed in order to protect stack of pouches 104 after the pouches are manufactured. Container 5 may be lined with a liner to prevent debris, dust, moisture, or air from entering container 5 after it is sealed. The liner may also be provided in the form of a liner that is disposed on the outer surface of container 5 or otherwise contains container 5. The liner may be a paper-based material, a rubber, a polymer, a plastic, or other materials useful for keeping contaminates away from pouch stack 104.

Container 5 includes a bottom wall 7 against which pouches 104 are stacked. Bottom wall 7 defines a door opening that is initially closed by an openable door 9. Door 9 may be opened by tearing it away from bottom wall 7 along perforated tear lines. The door opening may extend across the entire width of bottom wall 7 so that pouches 104 do not have to be substantially curled when pulled through the door opening. Door 9 also may be bent to an open position and then reclosed when container 5 is reusable. When a liner is used with door 9, a portion of liner may be connected to door 9 so that a portion of the liner is torn open when door 9 is opened.

When door 9 is removed, the leading edge 132 of the bottom pouch 110 is exposed through bottom wall 7. A separation arm 130 is moved into the door opening to engage the leading edge 132 and bend it down through the door opening where it is grabbed by pouch removal arm 140.

Figure 2:
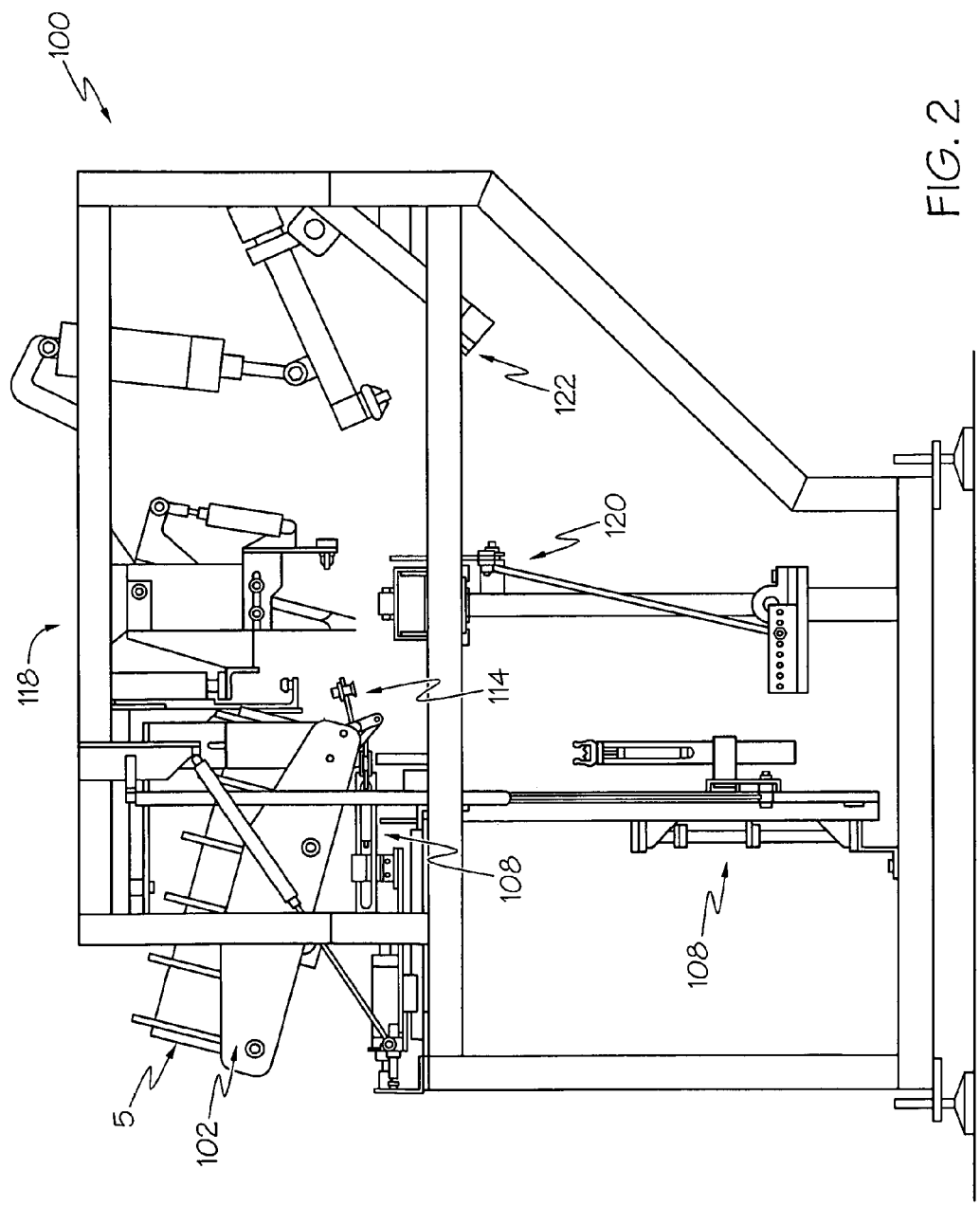
FIG. 2 is side elevation view of a pouch packaging apparatus of the invention disposed in a pouch magazine of a pouch handling apparatus configured to remove pouches directly from the pouch packaging apparatus.

An exemplary pouch handling apparatus usable with container 5 is indicated generally by the numeral 100 in the accompanying drawings. Other apparatus also may be with container 5. The exemplary apparatus 100 generally includes pouch magazine 2 configured to hold one container 5 that contains a plurality of adjacent pouches (a stack of pouches) 104 in a ready position. The stack of adjacent pouches 104 may be wedge-shaped when the pouches include a closure device 106. Door 9 of container 5 is configured to provide a separation lip at a portion of bottom wall 7 that functions as a pouch separator 136 that helps to ensure only the first pouch 110 is removed from the plurality of adjacent pouches 104 without upsetting the position of the second pouch 112 so that second pouch 112 may be properly positioned as the first pouch. The first pouch 110 is dragged over this lip when the leading edge of the pouch is bent through the door opening. Apparatus 100 further includes a pouch opener 114 (FIG. 2) and a shuttle that moves pouches to a filling station 118 and a transfer arm mechanism 120 that moves filled pouches to a sealer 122.

Figure 3:
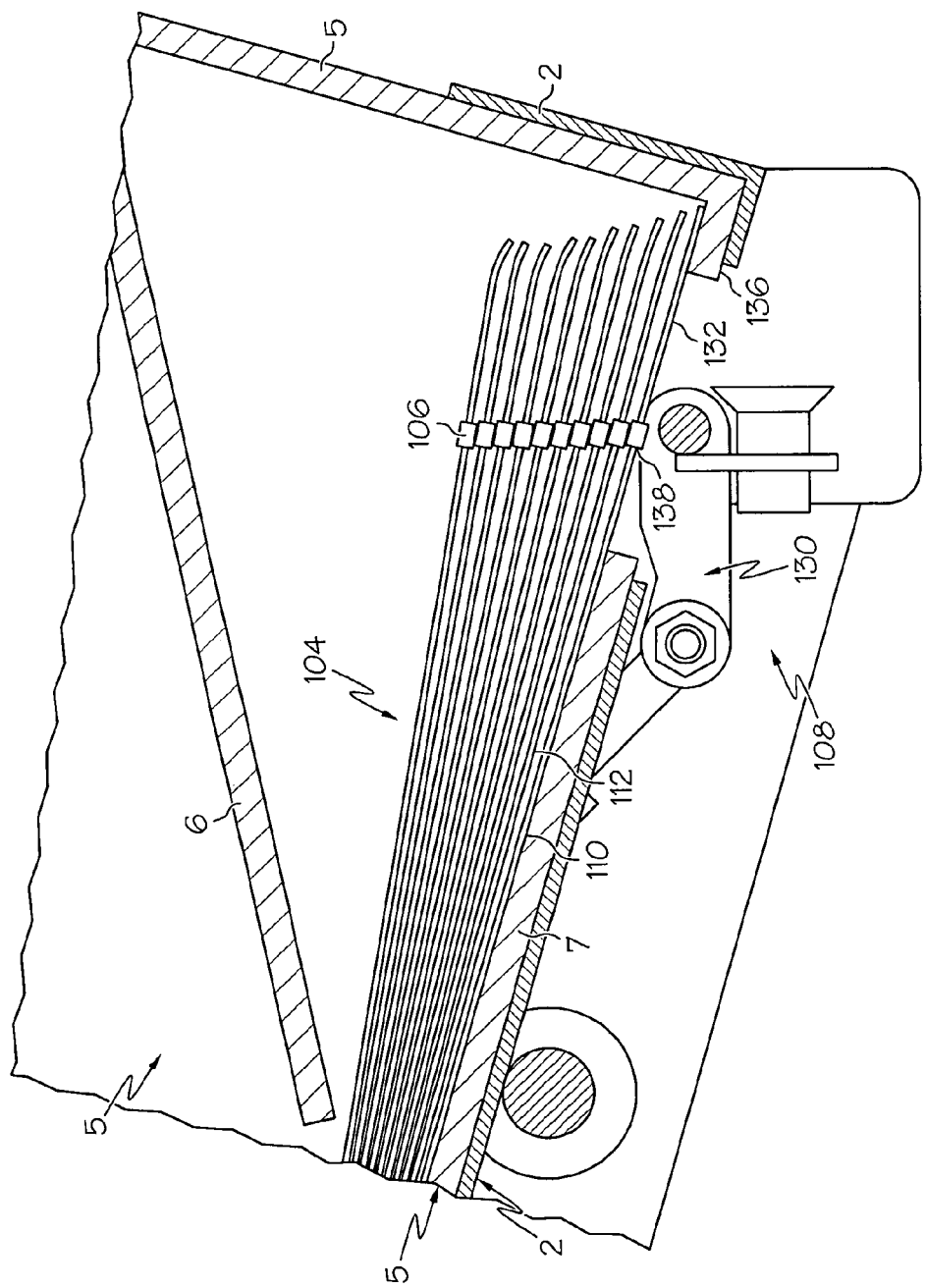
FIG. 3 is side section view of the front of the pouch packaging apparatus in the pouch magazine with the pouch separation arm in a first position.
Figure 4:
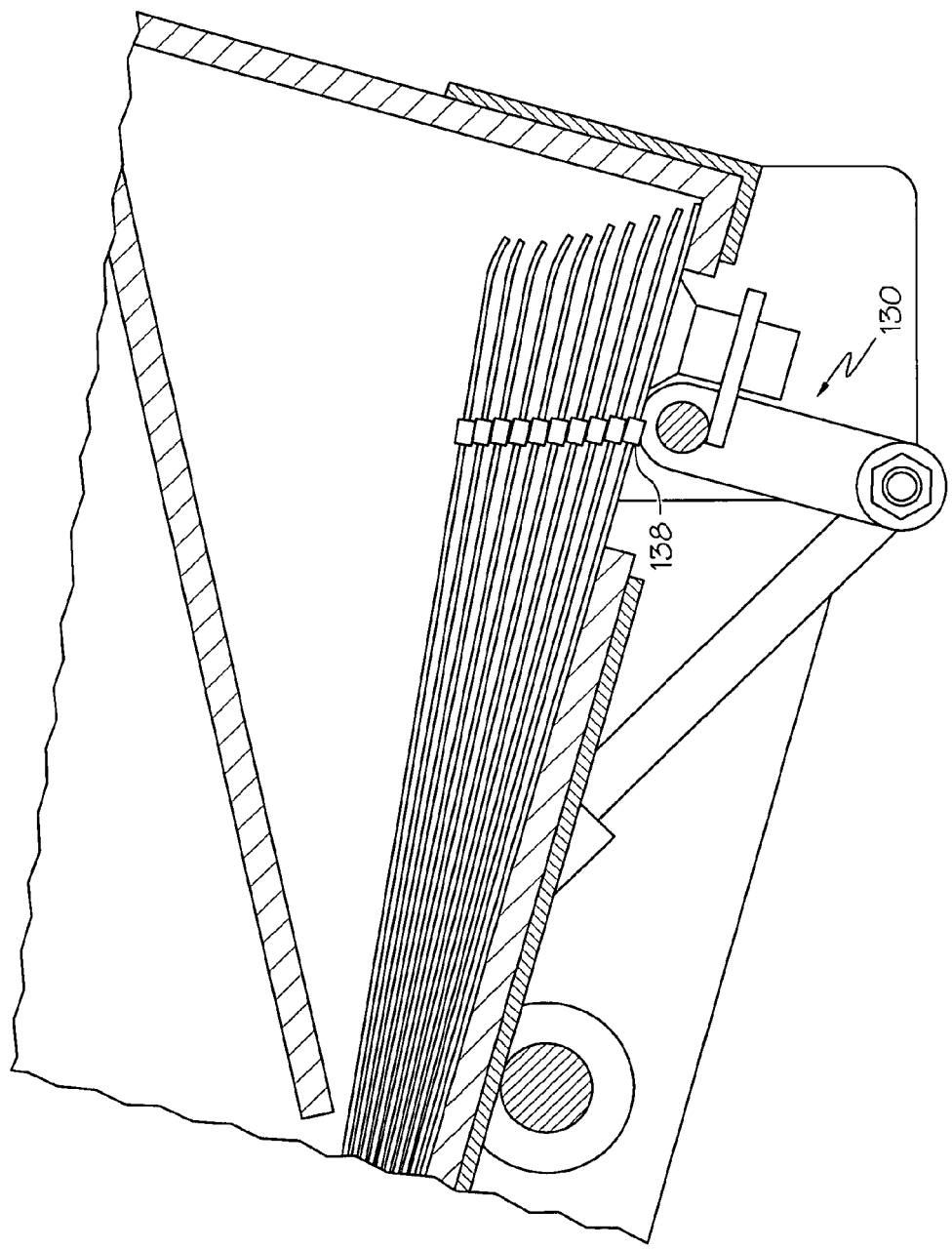
FIG. 4 is a view similar to FIG. 3 with the pouch separation arm in a second position.
Figure 5:
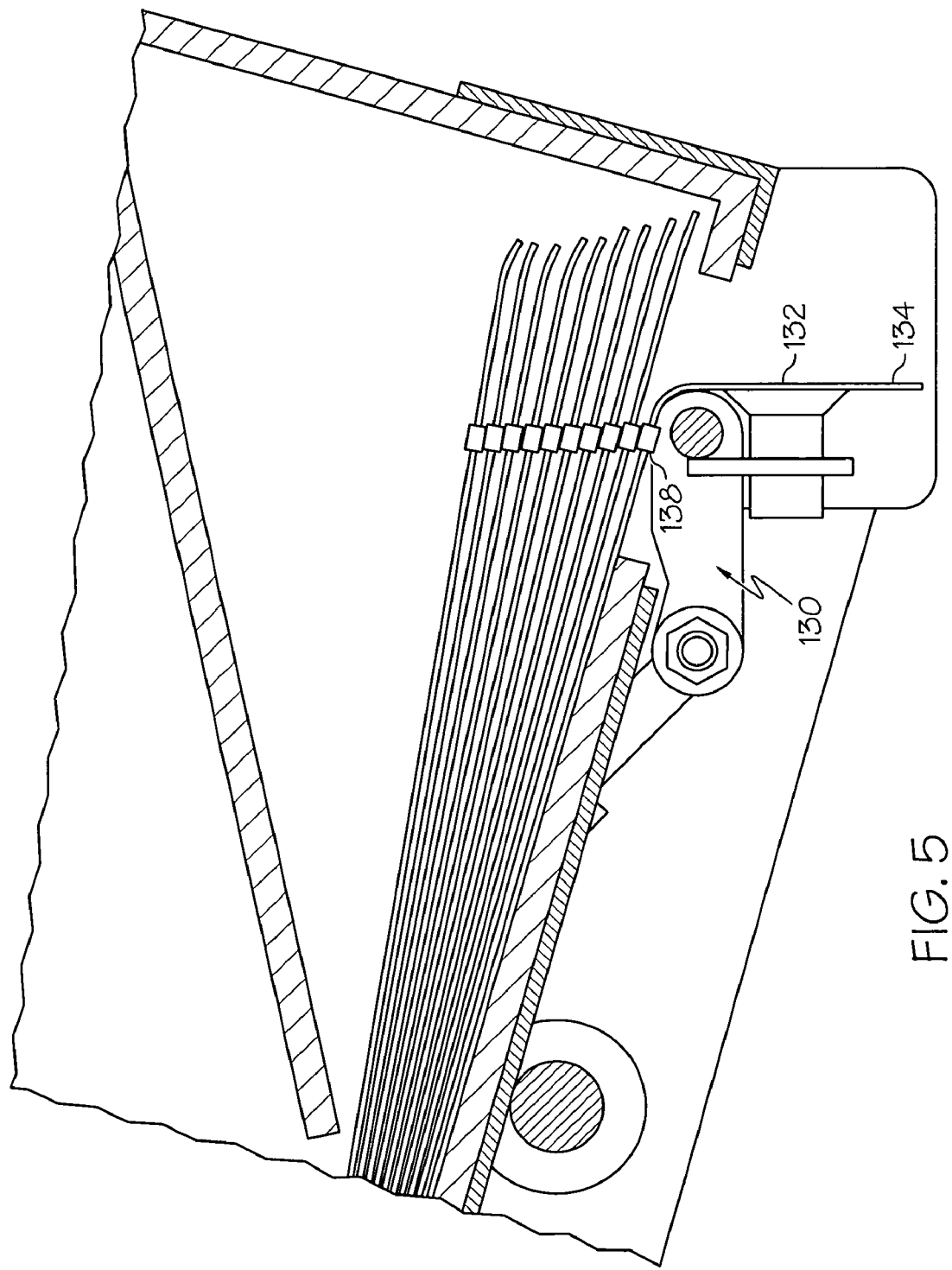
FIG. 5 is a view similar to FIG. 3 with the pouch separation arm back in the first position having separated a pouch from the stack of pouches.

The method for removing first pouch 110 from plurality of adjacent pouches 104 is generally described with reference to FIGS. 3-7. Pouches 104 are provided to the operator of apparatus 100 packaged within container 5. The user of container 5 opens door 9 and places container 5 in magazine 2 with the door opening aligned with separation arm 130. FIGS. 3 and 4 show separation arm 130 having a suction cup that engages first pouch 110 in order to pivot or bend a first portion of pouch 110 away from second pouch 112 about an axis as shown in FIG. 5. This leading edge 132 is bent down and out of the door opening of container 5. The axis is disposed intermediate the outer edges of the second pouch. For the purpose of separating the pouches, edge 132 may be any one of the edges of the pouches that is aligned with the door opening. In the exemplary apparatus 100, edge 132 is adjacent closure 106 opposite from the open end of the pouch that is used to fill pouch. Bending this edge allows the spacing created by closure 106 to help separate the pouches. Bending edge 132 away from the reference plane defined by second pouch 112 allows most joining (e.g. static, cohesion, intermolecular) forces between first 110 and second 112 pouches to be overcome without significant movement or manipulation of second pouch 112. This method is also described as peeling edge 132 of first pouch 110 from second pouch 112. The axis about which the edge is bent is disposed parallel to the reference plane. In one configuration, edge 132 should be bent at least 30 degrees from the reference plane of second pouch 112 to ensure good separation. The leading end 134 of first pouch 110 may be pulled over a projecting portion of bottom wall 7 that helps prevent second pouch 112 from bending with first pouch 110 to the bent position of FIG. 5.

Figure 6:
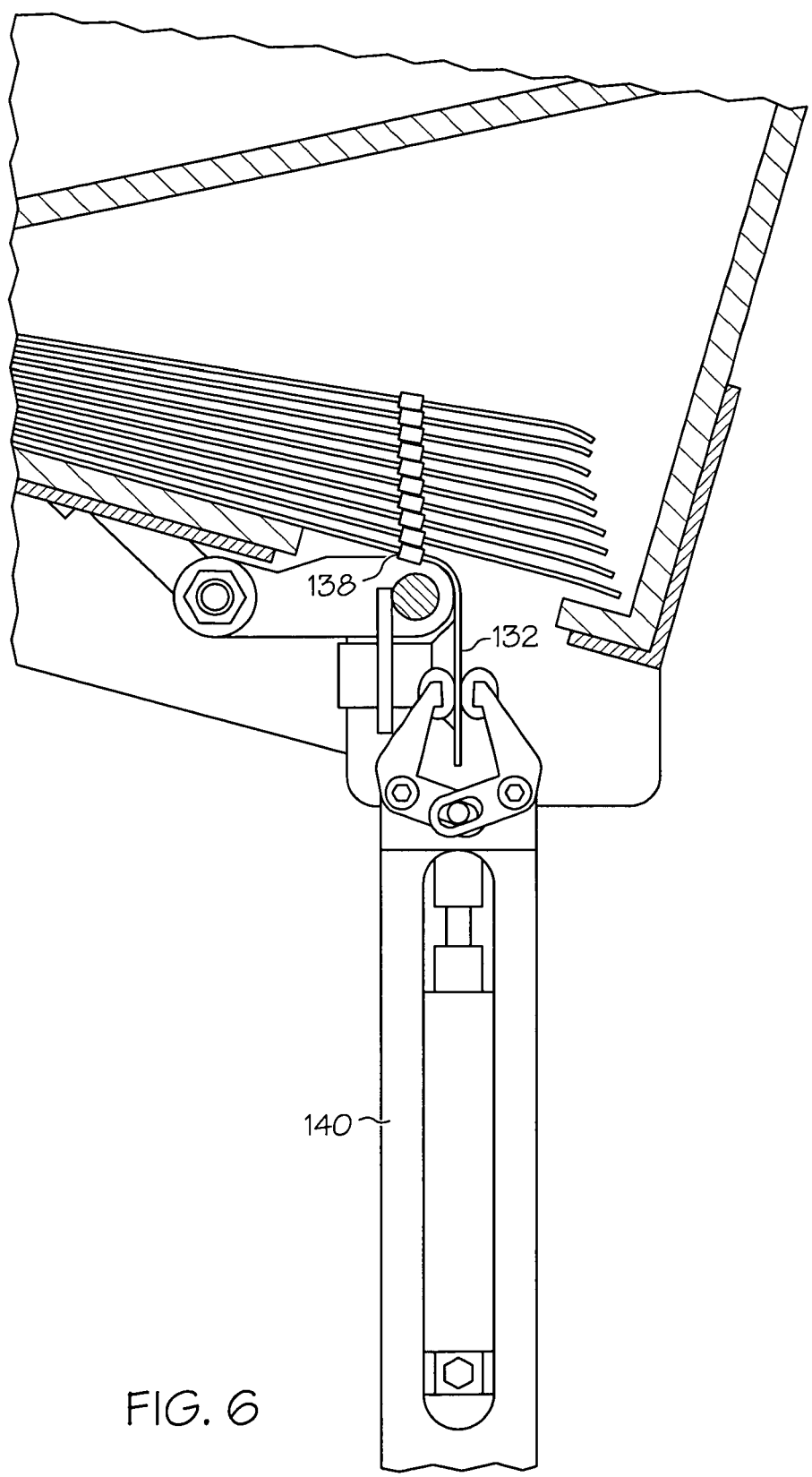
FIG. 6 is a view similar to FIG. 3 showing a pouch removal arm in a second position grabbing the separated pouch.
Figure 7:
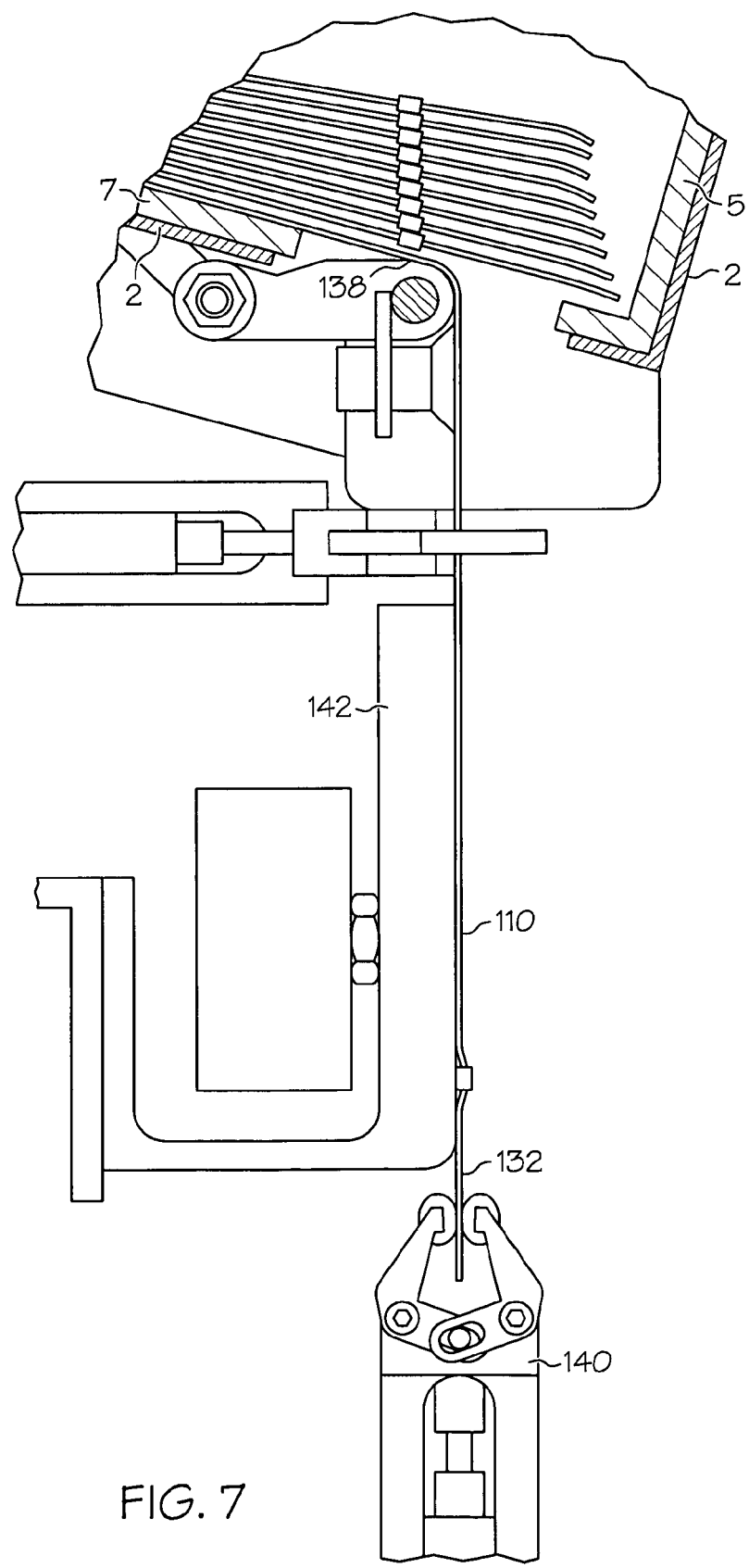
FIG. 7 is a side view showing the pouch removal arm moving from the second position toward its first position to pull the pouch to a pouch holder.

FIGS. 6-7 show the next step wherein first pouch 110 is pulled out from under second pouch 112 by a pouch removal arm 140 that pulls pouch 110 in a direction nonparallel to the reference plane of the second pouch. As first pouch 110 is pulled out of magazine 102, the body of pouch 110 remains in its own reference plane until the body reaches the edge 138 (edge 138 may be a portion of bottom wall 7 or a curved mandrel or a portion of separation arm 130) over which leading edge 132 is bent. As first pouch 110 is pulled from magazine 102, it slides over a pouch holder 142 that helps maintain the upright configuration of first pouch 110 so that it may be engaged by a shuttle.

Figure 1B:
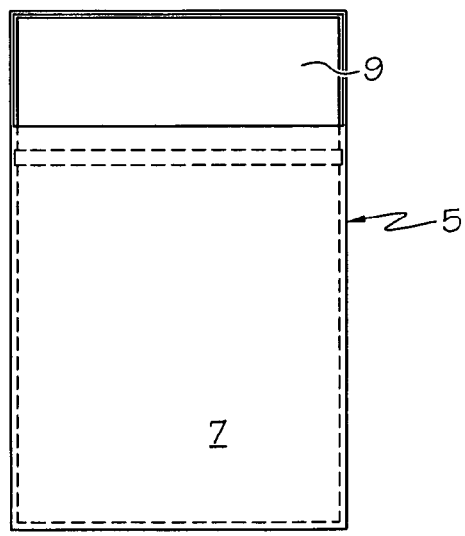
FIG. 1B is a bottom plan view of the apparatus of FIG. 1A showing the closed door.
Figure 1C:
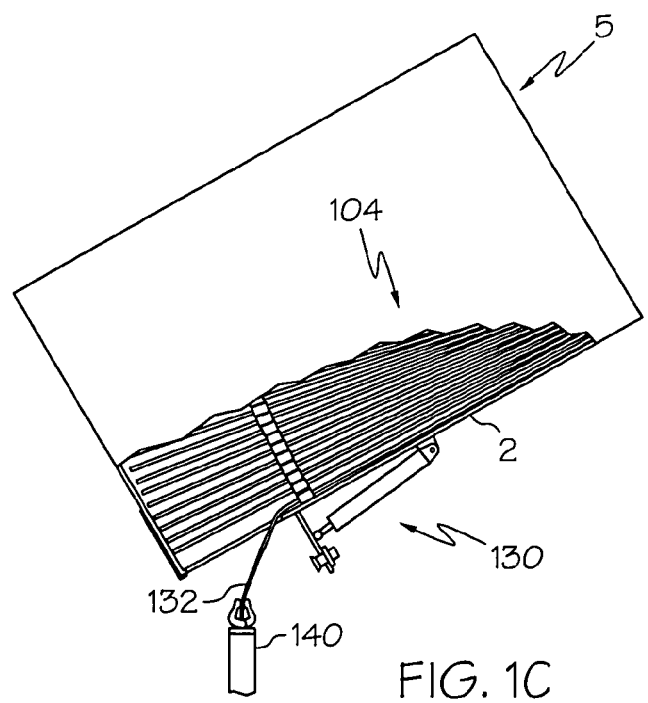
FIG. 1C shows the pouch packaging apparatus loaded into a magazine with the door removed and a separation arm bending the leading edge of a pouch down through the door opening where it is being grabbed by pouch removal arm.

As shown in FIG. 1, the door opening may be offset from the edge of box 5 so that the leading edge of each pouch 104 is pulled over a small ledge 136. This helps separate pouches 104.

Box 5 may be provided in a reusable configuration wherein door 9 is not completely removed from box 5 and is reclosable. In this configuration, door 9 may slide or pivot back and forth between the open and closed positions.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described. The different elements of apparatus may be used singularly in combination with other apparatus configurations in combination with one another to define apparatus and methods.

The invention claimed is:

1. A method for removing a first pouch from a plurality of adjacent pouches; the plurality of adjacent pouches including a second pouch disposed immediately adjacent to the first pouch; each of the pouches having edges; the method comprising the steps of:
    providing a plurality of pouches in a pouch container having a door opening disposed adjacent one edge of the first pouch;
    providing an automated pouch separator;
    placing the pouch container in a location relative to the pouch separator;
    moving at least a portion of the pouch separator through the door opening to engage the first pouch without moving the pouch container; and
    removing the first pouch through the door opening away from the second pouch to remove the first pouch from the pouch container.

2. The method of claim 1, further comprising the steps of providing the plurality of pouches in a pouch container with a door having a closed condition that blocks the door opening and opening the door.

3. The method of claim 2, further comprising the step of tearing the door away from the container to open the door.

4. The method of claim 2, further comprising the step of forming a separation lip on the container when the door is open and dragging the edge of the first pouch over the separation lip when the edge of the first pouch is bent through the door opening.

5. The method of claim 2, further comprising the step of sealing the pouches inside the pouch container before the door is opened.

6. The method of claim 5, further comprising the step of providing the pouch container with a liner and tearing a portion of the liner when the door is open.

7. The method of claim 1, further comprising the step of bending an edge of the first pouch away from the second pouch through the door opening to define a bent edge and a bend in the first pouch during the step of removing the first pouch from the pouch container.

8. The method of claim 1, wherein the step of removing the first pouch from the pouch container includes the step of sliding a majority of the first pouch along a portion of the second pouch.

9. The method of claim 1, further comprising the step of sealing the pouches inside the pouch container before the door opening is formed.

10. A method for removing a first pouch from a plurality of adjacent pouches; the plurality of adjacent pouches including a second pouch disposed immediately adjacent to the first pouch; each of the pouches having edges; the method comprising the steps of:
    providing a plurality of pouches in a pouch container having a door opening disposed adjacent one edge of the first pouch;
    placing the pouches and pouch container in an automated pouch separator with the door opening facing downwardly;
    moving at least a portion of the pouch separator up through the door opening to engage the bottom surface of first pouch without moving the pouch container;
    bending an edge of the first pouch away from the second pouch through the door opening to define a bent edge and a bend in the first pouch; and
    pulling the first pouch downwardly away from the second pouch while sliding a majority of the first pouch along a portion of the second pouch.

11. The method of claim 10, further comprising the steps of providing the plurality of pouches in a pouch container with a door having a closed condition that blocks the door opening and opening the door.

12. The method of claim 11, further comprising the step of sealing the pouches inside the pouch container before the door is opened.

13. The method of claim 12, further comprising the step of providing the pouch container with a liner and tearing a portion of the liner when the door is opened.

14. The method of claim 11, further comprising the step of tearing the door away from the container to open the door.

15. The method of claim 14, further comprising the step of forming a separation lip on the container when the door is open and dragging the edge of the first pouch over the separation lip when the edge of the first pouch is bent through the door opening.

\* \* \* \* \*